Nov. 28, 1939.     C. B. SIMONEAU     2,181,747

BASEBOARD HEAT DISTRIBUTION WITH AIR CONDITIONING

Filed Dec. 2, 1937

Charles B. Simoneau
INVENTOR.

BY Francis V. McCarthy
ATTORNEY.

Patented Nov. 28, 1939

2,181,747

UNITED STATES PATENT OFFICE 2,181,747

BASEBOARD HEAT DISTRIBUTION WITH AIR CONDITIONING

Charles B. Simoneau, Lynn, Mass.

Application December 2, 1937, Serial No. 177,753

3 Claims. (Cl. 98—32)

My present invention pertains to the distribution of heat at the baseboard of a room and the combination of the same with air conditioning means. Heat may be created by steam, hot water, electricity or hot air. That part of my invention relating to the distribution of the heat comprises means for supplying heated air to the room at the baseboard. This means can be used in conjunction with any known heating medium as will be pointed out hereinafter.

In order to provide a clear understanding of my invention, I will, first, describe it as applied to heating with a hot air furnace and then in combination with other heating means, using for illustration of the latter combination, means for providing steam heat at the baseboard.

As stated in my pending application for a patent, Serial Number 39,137, the usual means for supplying heat from a hot air furnace is through a pipe of large diameter, which leads to a register positioned in an opening in the floor or in the wall at or near the baseboard. The register is usually equal to or slightly larger in diameter than the supply pipe and when heat is sent through the pipe and register convection results and is depended upon for heating purposes.

In my device, instead of supplying heated air to a room at a single point, as is done when such a register is used, the heat is supplied over a wide area in the manner which I will describe hereinafter, thus providing efficient heat with a minimum of convection, and also providing indirect radiation of heat at or near the floor by means of low temperature heating.

Figure 1:
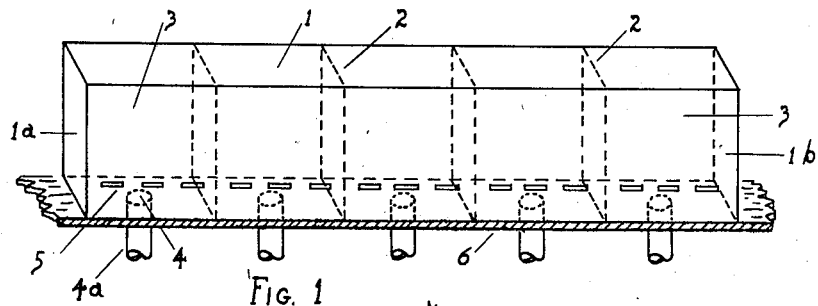
Figure 2:
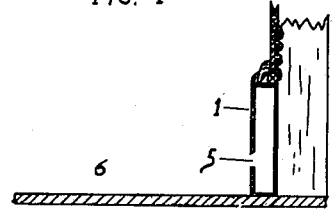
Figure 3:
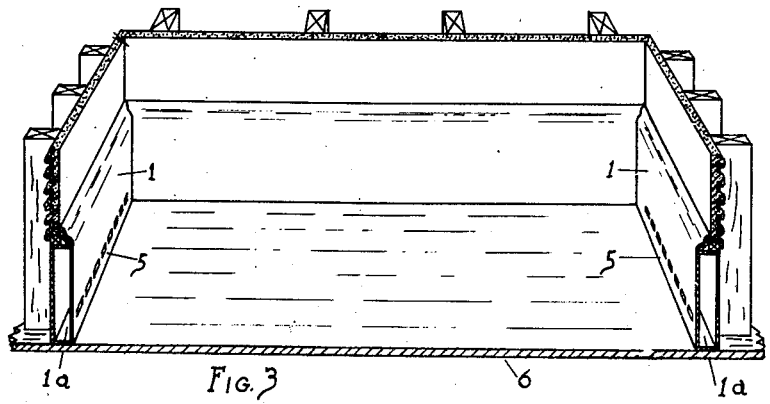
Figure 4:
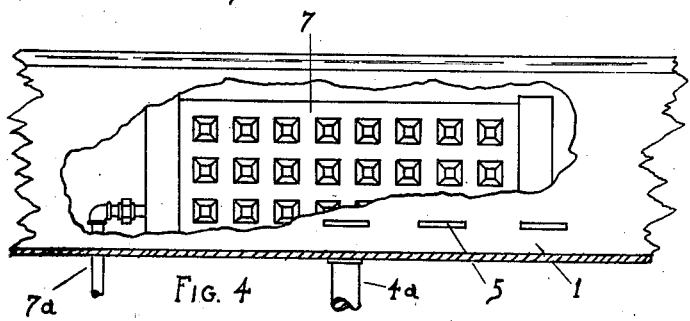

Before proceeding to describe my invention and its method of operation, I desire to call attention to the drawing which accompanies this application for a patent as a part thereof, and in which Figure 1 illustrates my invention as applied to the distribution of heat from hot air furnace; Figure 2 is a detail in section showing the operative position of my invention when installed in a room; Figure 3 shows the combined heat distributing device and air withdrawal means positioned in a room; and Figure 4 is a detail showing baseboard steam radiation with my baseboard device.

In houses as usually constructed, there is a baseboard running around the walls at the floor When this baseboard is removed from old construction, there is a space averaging about 1½ to 2 inches deep and with a height equal to the height of the baseboard. It is in this space that my device is positioned in both old and new construction. I accomplish this in the manner hereinafter described; but it should be understood that the following description is for illustration of the principle of my invention only and that modifications thereof come within the scope of my invention if covered by the appended claims.

As shown in Figures 1, 2 and 3, I provide one or more rectangular metallic casings, 1, to meet the predetermined heating requirements of each room. The metallic casing is closed at both ends, 1ª and 1ᵇ, and is divided by partitions 2 into a plurality of chambers 3. In the bottom of each chamber is a distribution opening 4 and into each opening is fitted a pipe 4ª which passes upward through the floor 6 from the supply pipe containing the heating medium (not shown). In the front wall of each chamber is a plurality of openings 5 into the room. As shown in Figure 4, a steam radiator 7 is positioned within casing 1, 7ª being connecting means between the heater and radiator as in my patent numbered 2,014,117, issued September 10, 1935.

Heat supplied to the room through the supply pipe passes through all of the distribution pipes to the chambers in the baseboard casing. The result is that hot air passing through the openings in the front walls of the chambers is widely and uniformly distributed, instead of being concentrated as heretofore; and, instead of being forced to the ceiling by convection resulting from said concentration of heat, the lower part of the room is heated more quickly thereby than by the methods now in use. Furthermore, the walls of the chambers are heated and thus heat is radiated into the room from the baseboard casing, the diffused flow of hot air and the radiated heat combined resulting in efficient heating of the room at a lower temperature than is supplied from a single register, which latter is intended to and does, if the heating plant is efficient, project into the room a blast of hot air through the register.

When used in combination with air conditioning means, the air conditioned heating medium passes into the room widely distributed through the baseboard construction already described, instead of through a single opening or several isolated openings as now practiced, thus avoiding the creation of drafts which is a known objectionable feature of air conditioning as now practiced.

In conjunction with the distribution of conditioned hot air through the above described baseboard construction, I provide for air conditioning, when desired, a casing of the same construction positioned along another wall of the room, preferably along the base of the opposite wall and through this casing and the intake openings thereof the air is drawn back to the air conditioning apparatus without perceptible draft, thus avoiding contracted suction of air from the room, which is another unsatisfactory feature of air conditioning as it sets up drafts in the room. This is my preferred construction for combined heating and air conditioning; but it should be understood that my heat distribution means may be used with any means for withdrawing air from the room and come within the scope of my invention.

To provide air conditioning with steam, hot water or electricity or other heating medium than air from a hot air furnace, radiators or other heating units, as, for example, electric resistance coils, are placed in casing 1. The arrangement shown in Figure 4 is illustrative of all except hot air furnace distribution, which has been described hereinbefore. Instead of being connected with the furnace, the pipes 4a are connected with air conditioning apparatus which sends air into a room through pipes. Assuming that there is heat in the radiator 7, the air from the conditioning apparatus enters the chambers in casing 1 through pipes 4a, is heated while circulating around and through the heated radiator and passes into the room through apertures 5 while the radiator is radiating heat indirectly through the casing. The withdrawal of the air from the room is as already described in discussing hot air furnace heating and air conditioning.

All parts of the casing through which the heating medium passes into the room, except the front walls, may be insulated to prevent loss of heat units. When installed, the front of a casing has the same appearance as to position and space occupied as the usual baseboard.

Having described my invention and its mode of operation, what I claim is:

1. In a device of the class described, means for providing diffused hot air distribution and indirect baseboard radiation of heat units in a room, said means comprising a casing, chambers in the casing, partitions between the chambers, openings in the front walls of the chambers for emission of hot air into the room, and openings in the bottom walls of the chambers adapted to communicate with the supply pipe of a heater for admission of hot air to the chambers.

2. In a device of the class described, means for providing diffused withdrawal of air from a room, said means comprising a casing, chambers in the casing, partitions between the chambers, openings in the front walls of the chambers and openings in the bottom walls of the chambers adapted to communicate with the return pipe of an air conditioning apparatus.

3. In a device of the class described, the combination of means for diffused distribution of air in and means for diffused withdrawal of air from a room at the baseboards thereof, said combined means acting cooperatively to maintain in the room air of proper temperature and purity and comprising a casing for air distribution and a casing for withdrawal of air, the air distribution casing having chambers therein, partitions between the chambers, openings in the bottom walls of the chambers adapted to admit air to the chambers, means within the chambers adapted to provide heat to the chambers and therethrough to the room and openings in the front walls of the chambers for the passage to the room of air heated within the chambers, the casing for withdrawal of air from the room having chambers therein, partitions between the chambers, openings in the front walls of the chambers for the passage of air therethrough from the room and openings in the bottom of the chambers for the withdrawal of air through the intake pipe of an air conditioning apparatus.

CHARLES B. SIMONEAU.